United States Patent [19]

Clark et al.

[11] Patent Number: 5,525,650

[45] Date of Patent: *Jun. 11, 1996

[54] ELECTROCOATING COMPOSITION OF A POLYAMINE SELF-CONDENSED EPOXY ADDUCT AND COATINGS PRODUCED THEREBY

[75] Inventors: Peter D. Clark, Farmington Hills; John A. Gilbert, Beverly Hills, both of Mich.; Gunther Ott, Munster, Germany; Dieter Rühl, Munster, Germany; David J. Santure, Munster, Germany

[73] Assignee: BASF Corporation, Clifton, N.J.

[*] Notice: The term of this patent shall not extend beyond the expiration date of Pat. No. 4,920,162.

[21] Appl. No.: 333,620

[22] Filed: Nov. 2, 1994

Related U.S. Application Data

[63] Continuation of Ser. No. 112,903, Aug. 26, 1993, abandoned, which is a continuation of Ser. No. 973,924, Nov. 10, 1992, abandoned, which is a continuation of Ser. No. 759,734, Sep. 12, 1991, abandoned, which is a continuation of Ser. No. 626,226, Dec. 7, 1990, abandoned, which is a continuation of Ser. No. 507,329, Apr. 10, 1990, abandoned, which is a division of Ser. No. 288,327, Dec. 22, 1988, Pat. No. 4,920,162.

[51] Int. Cl.$^6$ ........................................ C08L 63/00
[52] U.S. Cl. .................. 523/400; 523/428; 523/429; 523/404; 523/433; 523/434
[58] Field of Search ........................ 523/400, 404, 523/428, 429, 433, 434

[56] References Cited

U.S. PATENT DOCUMENTS

| | | |
|---|---|---|
| 4,433,078 | 2/1984 | Kersten et al. . |
| 4,661,541 | 4/1987 | Batzill et al. ............................ 528/110 |
| 4,711,917 | 12/1987 | McCollum et al. . |
| 4,780,524 | 10/1988 | Dobbelstein et al. ................... 528/109 |
| 4,920,162 | 4/1990 | Clark et al. ............................. 523/400 |

*Primary Examiner*—Edward J. Cain
*Attorney, Agent, or Firm*—Kenyon & Kenyon

[57] ABSTRACT

The invention relates to a novel electrocoating composition for metallic substrates that exhibits "thick-build" protective properties at "medium-build" thicknesses. It is composed of a self-addition epoxy resin-polyamine adduct, a blocked isocyanate cross-linker, a polyglycol-polyamine grind resin, a plasticizer, an anti-cratering agent and pigments.

26 Claims, No Drawings

ELECTROCOATING COMPOSITION OF A POLYAMISE SELF-CONDENSED EPOXY ADDUCT AND COATINGS PRODUCED THEREBY

This application is a continuation of Ser. No. 08/112,903, filed Aug. 26, 1993, now aband. which is a continuation of Ser. No. 07/973,924 filed Nov. 10, 1992 now aband. which is a continuation of Ser. No. 07/759,734 filed Sep. 12, 1991, now abandoned, which is a continuation of Ser. No. 07/626,226, filed Dec. 7, 1990, now abandoned, which is a continuation of Ser. No. 07/507,329, filed Apr. 10, 1990, now abandoned, which is a divisional of Ser. No. 07/288,327, filed Dec. 22, 1988, now U.S. Pat. No. 4,920,162.

Since their development in the 1960's, cationic electrodeposition resins have been widely applied as coatings for metal substrates. Most automobile manufacturers look to these coatings as primary protective agents against harmful effects of the environment. Desirable automobile coating properties, such as corrosion resistance, flexibility and substrate adherence, occur in part because of the presence of such cationic resins.

In a typical electrocoating, the complete composition includes the principal (cationic) resin, a cross-linker, a grind resin, pigments, and other additives such as control agents, solvents and fillers. Most principal resins applied in this context typically constitute adducts of flexibilized epoxy resins (combinations of aromatic diepoxides and difunctional flexibilizing agents, such as aliphatic diols) and terminating polyamines. The cross-linkers are typically blocked polyisocyanates. The grind resins are typically lower weight versions of the principal resin or are surfactant-like compounds with active hydrogen groups that can react with the cross-linker. It is generally thought that the aromatic moieties of the resins in the coating partially contribute to hardness and corrosion resistance while the aliphatic portions contribute to its flexibility.

The thicknesses of coatings also affect many of their protective properties. Corrosion resistance, chip resistance, color, finish depth, and other, similar factors are in part dependent upon this physical parameter.

Generally, electrocoatings will fall into one of three thickness or "build" categories. Standard-build coatings will range in thickness from 15 to 22 microns; medium-build coatings will range in thickness from 24 to 28 microns; and thick-build coatings will range in thickness from 30 to 40 microns. Of these three, the thick-build coatings best withstand the rigors of environmental challenge.

Nevertheless, thick-build coatings have several drawbacks. The first is their more costly nature owing to the higher resin and pigment content. The second is their tendency to produce a rough finish. Third is their greater flow and throw power variability as they are being electrodeposited.

Recent developments in the chemistry of cationic resins have significantly reduced cost factors for production of all these categories of coatings. For example, in U.S. Pat. Nos. 4,661,541 and 4,780,524, adducts of polyamines and a self-addition epoxy resin are described. These principal resins are fully as flexible as the chain extended resins employing diols, but they lack the diol moiety. Their flexibility is introduced by the multiple self-condensation of the epoxy groups of the starting epoxy resin component. This self-condensation is controlled so that undesirable gellation and high polymer chain branching are minimized.

These self-addition resins follow the pattern of physical properties known for cationic resins. Chemical factors being equal, the protective properties of the resulting coatings are directly related to their thicknesses. Consequently, the drawbacks attendant with a thick-build coating produced from such self-addition resins also result.

It is an object, therefore, to develop a coating composition from self-addition epoxy resins that exhibits desirable protective properties. It is a further object to develop such a coating in a cost effective manner. Yet another object is the development of a coating that contains a self-addition principal resin and that exhibits thick-build protective properties at a medium-build thickness.

SUMMARY OF THE INVENTION

These and other objects are achieved by the present invention which is directed to a coating composition of a self-addition epoxy resin-polyamine adduct. The novel compositions contain non-gelled, self-addition principal resins and have highly desirable protective properties.

The composition according to the invention is composed of a principal resin, a cross-linker, a grind resin, pigments, a plasticizing resin and, optionally, an anti-crater resin. The principal resin is a self-addition epoxy resin-polyamine epoxy adduct having pendant alkylphenoxy groups. The cross-linker is a blocked polyisocyanate compound, preferably a toluene diisocyanate compound, a blocked isocyanurate of hexane diisocyanate or mixtures thereof. The grind resin is a reaction product of an aromatic diglycidyl ether, an aromatic diol, an aminopolyalkoxy alcohol, diamines and an alkylaryl glycidyl ether. The plasticizer is preferably an poly(alkylene oxide) alcohol compound, most preferably aryl-substituted. The anti-cratering agent is selected from polyacrylates, polyethers, polyesters, and silicones. One preferred material is a polyacrylate resin having pendant alkyl, aromatic and dialkylamino groups. The pigments are selected from inorganic, organometallic and organic compounds contributing color, bulk, filler and catalytically reactive properties to the composition.

In general, the weight percentages of components present in the composition relative to the total weight of non-volatile solids are about 30% to 55% principal resin, about 15% to 30% cross-linker, up to about 20% grind resin, about 3% to 12% plasticizer, up to about 35% pigments and up to about 3% anti-cratering agent. Adjustments of these ranges can be made according to the specific needs of the coating application at hand, but the adjustment will require rebalancing other similar components present in the composition. Throughout this specification and appended claims, the phrase "up to about" is intended to recite compositional ranges which include 0% at the lower end.

The composition can also be formulated into an electrodeposition bath according to the invention. Defoamer, neutralizing acids, solvents and aqueous media are further ingredients present in such a bath. In a typical bath formulation, the pH will range from between 4.5 and 7.

Further included according to the invention are metallic articles electrocoated with the foregoing composition.

DETAILED DESCRIPTION OF THE INVENTION

The composition of the invention is a fully formulated, cationic electrodeposition coating that has application for all metallic substrates. Without significant pilot or field tests, it can replace the cationic electrocoating formulations presently applied in commercial operations and will exhibit superior protective properties and cost savings. Little or minimal adjustments of its electrocoating parameters are required relative to those accorded to the formulations sold on the market.

Its advantages over commercial formulations include better corrosion resistance, better flexibility, a simpler, more foolproof design, and cost savings through development of thick-build properties at a medium-build thickness.

Although not intended as a characterization of the invention, it is believed that the combination of the self-addition principal resin, the cross-linker, the grind resin and the plasticizer develop the protective properties discovered according to the present composition. As a coating on an article, these ingredients are merged into a three-dimensional matrix supporting the pigment. Their individual chemical structures, of course, are fused into the matrix, and all components are in some fashion cross-linked together so that the composite properties of the coating are more than the properties of the individual ingredients. What results is a coating with thick-build properties at a medium-build thickness.

The principal resin generally is characterized in U.S. Pat. Nos. 4,661,541 and 4,780,524, the disclosures of which are incorporated herein by reference. It constitutes a self-addition aromatic or alkylaromatic diepoxide adducted with a mixture of amines. The self-addition aromatic or alkylaromatic diepoxide is a reaction product of an aromatic or alkylaromatic diepoxide precursor of molecular weight of from about 800 to 1500 and an alkylphenol of the formula $RC_6H_4OH$, wherein R is hydrogen or an alkyl group of from 1 to 18 carbons. The molar ratio of diepoxide precursor to alkylphenol ranges from approximately 4:1 to 1.5:1, preferably about 2:1. The primary product formed is a self-addition dimer of the diepoxide precursor with a pendent alkylphenoxy group. Trimers, tetramers, pentamers and hexamers and the like of the diepoxide precursor, each having one or more pendent alkyl phenoxy groups, are also formed. The actual self-addition product contains a Gaussian distribution of such oligomers which is centered upon the dimers through tetramers.

In the principal resin, the amine mixture adducted to the self-addition diepoxide produces terminal amine groups. These provide the cationic sites which largely contribute to the ready dispersibility of the principal resin in the aqueous acidic medium. The equivalent ratio of amine mixture per epoxide group of the self-addition diepoxide is from 0.75 to 1, primary and secondary amines being counted as one equivalent each.

Preferred examples of the self-addition diepoxide include those formed from a starting material of a liquified bisphenol A diglycidyl ether (i.e., extended with bisphenol A) or an aliphatic-substituted bisphenol A diglycidyl ether. These preferred diglycidyl ether starting materials will have a molecular weight of from 350 to 2000. Typical preferred commercial formulations of the diglycidyl ether starting materials are sold under the trade names "EPON 828" and "EPON 1001" (Shell Chemical Co., Division of Shell Oil Company, 50 West 50th Street, New York, N.Y.), Araldite GY 2600 (Ciba-Geigy, Division of Ciba Corporation, Fair Lawn, N.J.), or DER 632 (Dow Chemical Co., Midland, Mich.). A preferred example of the alkylphenol is dodecylphenol.

Examples of amines for the amine mixture include aliphatic diamines and triamines, aliphatic alcohol amines, alkylene diamines, alkanol amines and N-alkyl substituted forms thereof. Especially preferred are the aliphatic diamines and alcohol amines having 1 to 10 carbons in the aliphatic group. Especially preferred examples are N,N-dimethylaminopropyl amine, ethanolamine and diethanolamine.

Any blocked polyisocyanate compound may be used as a crosslinker with the compositions of the present invention. These crosslinkers function to deblock at temperatures between about 120° C. to about 200° C. They will contain at least two, and preferably three or four, crosslinking sites. A first preferred type is the reaction product of trimethylol propane, toluene diisocyanate and an alkyl alcohol, which is used as the blocking group. A second preferred type is the reaction product of the isocyanurate of hexane-1,6 -diisocyanate and a secondary amine. A third preferred type of cross-linker is a mixture of the two foregoing cross-linkers. A particularly preferred example of the first is the product of trimethylol propane, toluene diisocyanate and ethylene glycol monopropyl ether or ethylene glycol monobutyl ether. A particularly preferred example of the second reaction product is tris(cyanohexyl)isocyanurate and dibutylamine.

These blocked isocyanates are known in the art. The former can be prepared by reaction of the diisocyanate with one equivalent of branching moiety followed by one equivalent of the blocking moiety (alcohol or amine) or by the reverse of this addition. The latter can be prepared by reaction of the isocyanurate and blocking amine. The details for their preparation are given in U.S. Pat. Nos. 4,780,524 and 4,252,703, the disclosures of which are incorporated herein by reference.

The grind resin according to the invention is an aromatic polyepoxy compound that has been reacted by hydrophilic amine. It is fully described in U.S. application Ser. No. 289,290, filed Dec. 22, 1988 (Attorney's Docket IN-1147) filed simultaneously with this application and entitled "Pigment Grind Resin", the disclosure of which is incorporated herein by reference. It is the reaction product of one or more aromatic diepoxides with one or more bis-aryl alcohols, an alkylaryl monoepoxide, one or more primary amines and a polyglycolamine. It contains active hydrogen sites (amine and alcohol groups) that will react with cross-linker. Although its chemical structure is not like that of the principal resin, it incorporates into the three-dimensional matrix of the coating and contributes to protective properties. A preferred example of the grind resin is the reaction product of bisphenol A diglycidyl ether, bisphenol A, 9 -amino-3,6-dioxanonan-1-ol, dimethylaminopropylamine and nonyphenolglycidyl ether.

According to the invention, the plasticizer is preferably a nonionic surfactant material. It functions, in part, to increase the flowability and leveling of the coating as it deposits on the metallic substrate. In their uncured forms, the combination of crosslinker, principal resin and grind resin form a very viscous micellular dispersion in aqueous acidic medium. This viscosity, which tends to inhibit flowability and leveling of the coating being deposited, is substantially decreased by the plasticizing resin. Moreover, the plasticizing resins chosen contain hydroxyl groups so that the plasticizing resin will cross-link into the cured network of the final coating.

Examples of the plasticizing resin useful in the present invention include alkylaryloxy polyalkoxy alcohols, such as nonylphenoxy polypropoxy alcohol or cresyloxy polypropoxy alcohol. The latter two examples are preferred and are sold commercially under the trade names "Paraplex WP-1" by Rohm & Haas, Inc., Philadelphia, Pa. and "Plastilit 3060", BASF AG, Ludwigshafen, Federal Republic of Germany.

A preferred anti-cratering agent according to the invention is a polyacrylate containing pendant alkyl, aromatic, hydroxyalkyl and aminoalkyl groups. It functions to cause uniform adherence of the electrodeposited coating to the surface of metallic substrate. It substantially minimizes the thinning of coating due to underlying surface defects such as the presence of grease, oil or dirt. A preferred example of the polyacrylate is the free radical addition polymer of butyl acrylate, 2-hydroxyethyl acrylate, dimethylaminoethyl methacrylate and styrene.

The pigments include such inorganic ingredients as carbon black, titanium dioxide, zeolite and kaolin clays, lead silicate, magnesium silicate, iron oxides, chromium salts, silicon oxides, barium sulfate, organic dyes and catalytic agents such as organotin oxides. They are generally described in U.S. Pat. No. 4,780,524.

The pigments are formed into a pigment paste by comminuting them with an aqueous dispersion of grind resin in a known manner (e.g., grind mill, ball mill and the like). Wetting agents, defoamers and surfactants also can be added to this grind paste. Typically, grinding to a Hegman grind number of no less than 6 will suffice.

The composition according to the invention is prepared in parts. The first part is an emulsion of principal resin, cross-linker, and plasticizing resin, in aqueous acidic medium. The second part is a paste of grind resin, pigments, defoamer and aqueous medium. The third, optional, part is a mixture of a flow agent of the anti-cratering resin in aqueous medium. These components are combined to form the electrodeposition bath. In addition to the foregoing ingredients, the bath will also contain defoamers, neutralizing acids, water and solvents.

The defoamers used in the emulsion paste and bath are commercially available products containing active hydrogen groups and are useful for preventing foam-up during preparation of the paste emulsion and the electrodeposition bath. Typical products useful in this regard are polyalkoxy nonionic surfactants, high acetylenic diols and other similar non-silicon containing organic surfactant compounds. Commercially available defoamers which are preferably useful include TriStar 27 (TriStar Chemicals Co., P.O. Box 38627, Dallas, Tex.) and Surfynol 104 (Air Products, Allentown, Pa.).

Organic and mild inorganic acids can be used to acidify and disperse the emulsion and paste formulations and the bath. The pH is preferably maintained at pH 4.5–7. Useful acids include, for example, acetic acid, lactic acid, formic acid and phosphoric acid.

In addition to the primary solvent, water, several other solvents are present either as artifacts from the resin synthesis or to facilitate the solvating power of the aqueous medium. Those solvents include alkyl ketones, aromatic compounds, alkyl alcohols and glycols and aromatic glycols. Examples include methylisobutyl ketone (MIBK), xylene, isobutanol, n-butanol, propyl glycol, butyl glycol, hexyl glycol and phenyl glycol.

The synthesis of the principal resin follows the procedures laid out in U.S. Pat. Nos. 4,780,524, and 4,661,541, the disclosures of which are incorporated herein by reference. Briefly, the diepoxide starting material is reacted with alkylphenol in a mixture of hydroxylic and lipophilic organic solvents and base catalyst at elevated temperature, preferably 100° C. to 190° C. Approximately 3 to 8, preferably about 3.5 to 4.5, equivalents of epoxy group per one equivalent of alkylphenol are used. The phenoxide (from base catalysis) reacts with the diepoxide to form monoepoxy alkoxy ether intermediate which then reacts with another diepoxide molecule to form a dimer. As mentioned above, the reaction continues so that dimers, trimers, tetramers, pentamers, and the like, of the diepoxide starting material are ultimately produced. The final theoretical molecular weight of the self-addition epoxide resin resulting from this reaction is between 2200 and 3000, while the average molecular weight is up to about 7000 to 8000 because of the presence of the higher order reaction products. The epoxy functionality of the final product is approximately 1.7 to 2.2.

This intermediate is then further reacted with a mixture of primary and secondary amines. The amount of amine is chosen so that the ratio of reactive amine functionality to remaining epoxy functionality on the intermediate is in the range of 0.6 to 1.1, preferably from about 0.75 to 1.0.

The synthesis of the cross-linker follows well known techniques described in the art; see, for example, German Offenlegungsschrift No. 2,702,002. Briefly, appropriate molar ratios of blocking alcohol such as ethyleneglycol monopropyl ether and toluene diisocyanate are first reacted and then subsequently is added the appropriate molar amount of the branching alcohol, trimethylolpropane. The reverse order of addition can be employed so that the branching alcohol is added first followed by the blocking alcohol. Likewise for the synthesis of the isocyanurate cross-linker, the hexane diisocyanate is first catalytically reacted to produce the isocyanurate and then dibutylamine is added to form the blocked cross-linker.

It has been found according to the invention that when the "branching alcohol" cross-linker is made by a reverse order addition, the resulting cross-linker deblocks at a lower temperature compared with that of the normal addition cross-linker. This property in turn provides more complete cross-linking in the hardened coating. Yellowing of the coating and subsequently applied over coats during baking may also be minimized by the use of this reverse order crosslinker.

The synthesis of the grind resin follows the techniques and procedures laid out in U.S. Patent Application entitled "Pigment Grind Resin" as referred to above. The diglycidyl ether of bisphenol A and another portion of bisphenol A are adducted under heated conditions in an appropriate solvent such as toluene or xylene. To the resulting chain lengthened diepoxide in a mixture of aromatic and hydroxylic solvents is then added an equivalent of 9-amino-3,6-dioxanonan-1-ol and an equivalent of dimethylaminopropylamine per two equivalents of diepoxide group present. After the amine termination reaction is completed by continued heating, about an equivalent of nonylphenol glycidyl ether is added for reaction with both the unreacted amine still present in the reaction mixture and with the active amine groups present in the intermediate. All reactions are carried out in organic solvent and under either ambient or elevated temperature.

The synthesis of the anti-crater resin follows a typical polyacrylate polymerization. The appropriate proportions of acrylate and aromatic olefin monomers are combined with a mixture of ketone and aromatic solvents. A free radical initiator, such as benzoyl peroxide, persulfide or diazo compound, is added and the reaction stirred under heated conditions until polymerization is substantially complete. A preferred method of performing the polymerization is the addition of the monomers dropwise to the polymerization solution.

Combination of the emulsion, paste, flow agent and solvents to form the coating bath follows procedures known in the art. Mixture of the ingredients following a recipe to produce approximately equivalent amounts of pigment and principal resin and a non-volatile solids content of approximately 5 to 35 percent will produce an appropriate bath. Of the non-volatile solids content, proportions of the various ingredients will be selected so that the principal resin is about 30 to 55 weight percent, the pigments are up to about 35 weight percent, the cross-linker is about 15% to 30%, the grind resin is up to about 20%, the plasticizer is about 3% to 12% and the anti-cratering is up to about 3%. Preferred weight ranges for these ingredients include about 38% to 42% principal resin, about 20% to 25% cross-linker, about 5% to 10% grind resin, about 5% to 8% plasticizer, about 20% to 30% pigment and up to about 1% anti-cratering agent. The preferred pH of the bath is about 5.8–6.2.

Pursuant to well-known electrodeposition techniques more fully described in R. L. Yates, "Electropainting." Robert Draper Ltd., Tedelington England (1966) and German Offenlegungsschrift 2,701,002, the coating composition in the aqueous bath described above can be applied to a metallic substrate. The metal substrate is connected to electrode leads and immersed in the above-characterized bath contained in a metallic tank which serves as the opposite electrode. Deposition is performed at a voltage of up to about 400 volts for periods of up to about 5 minutes, or until a thickness of from about 20 to 28 microns is achieved. The coated substrate is then removed from the tank, sprayed with ultrafilter permeate or deionized water to remove excess bath and then placed in a baking oven. The coating is baked for curing at a temperature of from about 120° C. to about 200° C., preferably approximately 150° C. to 180° C. for a period of about 5 to 90 minutes, preferably, 15 to 30 minutes.

Cured coatings produced in this fashion according to the invention display excellent corrosion resistance, chip resistance, anti-cratering, protective properties as well as exhibiting a smooth, even unblemished, unrippled finish and hiding of substrate blemishes and irregularities. It has been found that the corrosion resistance of this coating has high level acceptability when tested in a multiple recycle salt solution immersion/humidity scab corrosion procedure. In comparison, commercial standard-build coatings display a mid level acceptability in this test, while commercial thick-build coatings display high level acceptability in this test. Moreover, the compositions of the present invention are less susceptible to thermal degradation during baking cycles, resulting in less air pollution due to low molecular weight thermal degradation products.

The cured coating can serve as the protective film for all metallic substrates including steel, aluminum, brass, composites, copper, zinc plated materials, titanium and the like. It can function as the undercoat paint on autos, trucks, appliances, off-road vehicles, heavy machines, farm machinery and the like.

The invention will be further described in the following examples. The examples, however, are not meant as limitations of the invention which is fully set forth and characterized in the foregoing passages.

Example 1

Preparation of Principal Resin A

One-thousand-eight-hundred-five (1805) parts of a liquid epoxy resin based on bisphenol A with an epoxide equivalent weight of 188 are placed in a reaction vessel provided with a stirrer, reflux condenser, internal thermometer and a nitrogen inlet, together with 450 parts of nonylphenol, 63 parts of xylene and 7 parts of dimethylbenzylamine. The reaction mixture is heated to 130° C. and maintained at this temperature until the epoxide equivalent weight reaches a value of 460. Four-hundred-forty (440) parts of xylene are than added and the mixture is cooled to 80° C. A mixture of 126 parts of diethanolamine and 90 parts of N-methylethanolamine is added dropwise. The reaction is allowed to proceed at this temperature for 1 hour, after which 73 parts of ethanolamine are added dropwise, the reaction mixture is maintained for a further 2 hours at this temperature and subsequently diluted with 127 parts of hexyl glycol. A clear resin solution with a solids content of 80% and MEQ base value of 1.45 milliequivalents/g of solid resin is obtained.

Preparation of Principal Resin B

The procedure for the preparation of the principal Resin A is followed. The epoxide equivalent weight (EEW) approaches 400 in this case. The modified weights used are as follows:

| | |
|---|---:|
| Epoxy resin (EEW = 188) | 2,000 |
| tert-Butylphenol | 139 |
| Xylene | 60 |
| Dimethylbenzylamine | 8 |
| Xylene | 406 |
| Diethanolamine | 280 |
| N,N-dimethylaminopropylamine | 136 |
| Hexyl glycol | 166 |
| n-Propanol | 413 |

A clear resin solution with a solids content of 74.8% (measured for 1 hour at 190° C.) and a MEQ base value of 2.15 milliequivalents/g of solid resin is obtained.

Preparation of Principal Resin C

In a similar manner to the preparation of the principal Resin A, 1805 parts of an epoxy resin (EEW=188), 352 parts of nonylphenol, 67 parts of xylene and 10 parts of dimethyllaurylamine are allowed to react to 130° C. until an epoxide equivalent weight of 450 is reached. A 71.3% solution of ethanolamine/methyl isobutyl ketimine in methyl isobutyl ketone is added dropwise in the course of 1 hour at this temperature. The reaction is allowed to proceed for a further 7 hours, and the mixture is then diluted to a solids content of 83.5% (1 hour at 130° C.) with 141 parts of hexyl glycol. The resin has a MEQ base value of 1.68 milliequivalents/g of solid resin.

Preparation of a Cross-linking Agent I

A blocked isocyanate cross-linking agent (polyurethane cross-linking agent, reverse order) is prepared according to the following procedure. Slowly and with stirring in a nitrogen atmosphere is added 291 parts of an 80/20 isomeric mixture of 2,4-/2,6-toluene diisocyanate 0.08 parts of dibutyltin dilaurate and 180 parts of methyl isobutyl ketone, the temperature being maintained below 38° C. The mixture is maintained at 38° C. for a further half hour after which 75 parts of trimethylolpropane are added. After allowing the reaction to proceed for about 10 hours, 175 parts of ethylene glycol monopropyl ether is added and the mixture reaction kept 1.5 hours at 121° C. until essentially all the isocyanate groups are reacted. This depletion is recognized from the infrared spectrum.

The normal order blocked isocyanate can be prepared by the altering the foregoing order of addition pursuant to Example 1 of German Offenlegungsschrift 2,701,002.

Preparation of Cross-linking Agent II

A blocked isocyanate crosslinker (polyurea) is prepared according to the following procedure. Four-hundred-eighty-three parts of triisocyanurated hexamethylendiisocyanate and 193 parts of 2-hexanone are charged to a dry reactor. Dibutylamine (307 parts) are added slowly and with stirring under nitrogen atmosphere so that the temperature does not exceed 80° C. After all amine has reacted 14 parts of n-butanol and 0.2 parts of dibutyl tin dilaurate are added. The reaction mixture is heated to 80° C. until no isocyanate groups can be detected by infrared analysis.

Preparation of Aqueous Emulsions I–IV

The principal resins are then converted to aqueous emulsions by mixing the components listed in the table below and adding deionized water (emulsion 1). After 20 minutes homogenization, the mixture is further diluted, batchwise, with deionized water (emulsion 2). The dispersions are subsequently subjected to a brief vacuum distillation, the organic phase being separated off from the distillate.

| Emulsions | I | II | III | IV |
|---|---|---|---|---|
| Principal Resin A | 937.0 | 937.0 | — | — |
| Principal Resin B | — | — | 1002.0 | — |
| Principal Resin C | — | — | — | 898.0 |
| Cross-linking Agent I | 630.0 | 528.0 | — | 528.0 |
| Cross-linking Agent II | — | — | 388.0 | — |
| Dibutyltin Dilaurate | — | 8.0 | — | 8.0 |
| Solution of Lead (II) octoate (24% Pb) | 28.0 | — | 28.0 | — |
| Antifoam Solution | 1.2 | 1.2 | 1.2 | 1.2 |
| Glacial Acetic Acid | 26.1 | 26.1 | 29.1 | 33.7 |
| Deionized Water 1 | 748.0 | 748.0 | 820.0 | 780.0 |
| Deionized Water 2 | 1493.0 | 960.0 | 2240.0 | 1760.0 |
| Solids (1 hr. at 130° C.) | 31.8% | 35.1% | 26.4% | 28.5% |

Example 2

Preparation of Principal Resin D

The epoxy resin (liquid epoxy resin based in bisphenol A with an epoxide equivalent weight (EEW) of 188, see Table I for list of weights) is initially taken in a suitable reactor together with the phenol (see Table 1) and heated to 160° C. under a nitrogen blanket. This temperature is maintained until EEW I is reached. The mixture is then cooled by the addition of methyl isobutyl ketone (MIBK) and by external cooling to 125° C., and benzyldimethylamine is added. The temperature again slightly increases and it is maintained at 130° C. until EEW II is reached. The ketimine (prepared from diethylenetriamine and an excess of MIBK, so that an amine equivalent weight of 125 results) and diethanolamine are added. The temperature is maintained for 1 hour at 110° C., propylene glycol monophenyl ether is then added and the mixture is stirred for 30 minutes. The cross-linking agent I or II prepared as described in Example 1 is then added and the mixture is cooled to 90° C.

In the meantime, the dispersing bath is prepared from deionized water (H$_2$O I) and glacial acetic acid. The solution of the resin is dispersed therein. After 30 minutes lead octoate is added and stirring is continued for a further 30 minutes. A further quantity of water is then added (H$_2$O II) and stirring continued for 15 minutes. The dispersion is then filtered.

TABLE I

| Quantities Weighed Out for Principal Resin Preparation | | |
|---|---|---|
|  | Binder I | Binder II |
| Epoxy resins | 1162 | 1310 |
| Phenol | t-Butyl-phenol | p-Dodecyl-phenol |
| MIBK | 75 | 110 |
| Benzyldimethylamine | 8 | 7 |
| Cross-linking agent | Type I | Type II |
| Diethanolamine | 120 | 109 |
| Ketimine | 144 | 94 |
| Propylene glycol monophenyl ether | 123 | 159 |
| H2O I | 1370 | 1690 |
| Glacial acetic acid | 49 | 50 |
| Lead octoate | 24 | 146 |
| H2O II | 2515 | 2100 |
| EEW I | 385 | 370 |
| EEW II | 950 | 1080 |
| Solids (2 hours, 110° C.) | 34.8% | 35.7% |

Example 3

Preparation of Principal Resin E

To a clean dry reactor is added xylene. The mixing liquid is blanketed with pure N$_2$ and heated to 42° C.

Solid epoxy (characteristics and weights in Table II) is added at such a rate that the batch temperature never drops below 60° C., usually over a period of two hours. Heating is continued until 100° C. At this point, the dodecyl phenol is added and then heated to 118° C. Vacuum drying by distillation of xylene is started at this temperature and continued heating to 125° C. The pressure should be between 66 cm and 69 cm of Hg (88 kP–92 kP) at full vacuum. The drying stage should take between 1.0 and 1.5 hours. Break vacuum with pure nitrogen only. The batch is cooled to 115° C. The sample at this point should be (% non-volatiles (% N.V.)= 95.0 ±0.5).

At 115° C. benzyldimethylamine (BDMA) is added. The peak exotherm temperature should reach 129°–132° C. The temperature is maintained at 130° C. ± 2° C. and the polymerization is followed by EEW titration. Every 30 minutes the reaction is sampled and is stopped at an end point of 1100 ±10 EEW. The typical reaction time is 3 hours. Adjustments to the catalyst level may be necessary if extension period is ± 30 minutes from 3 hours.

At the target EEW, the reducing solvents are added followed by diethanol amine (DEOA).

The temperature of this reaction should not exceed 132° C. Cooling may be necessary at this point with jacket or coils. A vacuum suction is started immediately after the DEOA addition and pressure is reduced to 18 inches of Hg and held for 5 minutes. The pressure is further reduced in 2 inch Hg increments followed by short holding period until 26–27 inches of Hg is achieved. The batch is then cooled to 90° C. in one hour following addition of DEOA. To achieve this a good reflux rate should be attained in 20–25 minutes after the DEOA addition. All solvents are returned to the reactor.

After one hour of vacuum cooling, (T= 90° C.), ethylene glycol monohexyl ether and isobutanol are added without breaking vacuum. The batch is cooled for 35 minutes to 59°

C. ±2° C. under full vacuum to achieve the target temperatures during the specified time tables.

The dimethylamino propyl amine (DMAPA) is charged as fast as possible after the 35 minute cooling period. The batch temperature is kept below 63° C. The batch is held is kept between 54° C. and 60° C. for two hours after exotherm. Then it is heated 90° C. over one hour and this temperature is held for one hour. The batch is cooled to 80° C.

TABLE II

Characteristics and Weights of Ingredients

| Weight | Ingredient |
| --- | --- |
| 81.1 | Xylene |
| 33.9 | Xylene |
| 568.1 | EPON 1101F (EEW = 530 ± 10) |
| 75.9 | Dodecyl phenol |
| 1.1 | BDMA |
| 42.1 | Ethylene glycol monobutyl ether |
| 74.7 | Xylene |
| 42.6 | DEOA |
| 40.6 | Ethylene glycol monohexyl ether |
| 107.7 | Isobutanol |
| 13.3 | DMAPA |
| 1000.0 | Total Weight Principal Resin 70% N.V. |

Preparation of Emulsion

With the foregoing principal resin stirring at 80° C. (see Table III for weights) the acetic acid and plasticizer, Paraplex WP-I (sold by Rohm & Haas, see Table III) are added, followed by addition of crosslinker I prepared as described in Example 1. The resin mixture at this point should be at about 56° C. It is mixed for 15 minutes. The acetic acid is added to the batch and it is mixed thoroughly for one hour. Batch temperature should not exceed 57° C.

Then, over a period of 1 to 1.5 hours, the resin premix and acid as formulated above is added with agitation to the H$_2$O and Surfynol 104 (50% in ethylene glycol monobutyl ether starting at 25° C. This step is the high viscosity shear stage. Good mixing is important here, (N.V.= 55%). The temperature at this point should be 37° C. to 40° C. The mix is stirred for the next portion of H$_2$O over a period of 2 hours (about) 0.2 gal/min). It is held and mixed 30 minutes. The temperature should be between 30° C. and 32° C. If good mixing is not observed, add remaining H$_2$O at the same rate as above. The remaining water is added. Final emulsion temperature should be 27° C.-30° C.

TABLE III

| | Emulsion |
| --- | --- |
| Weight | Ingredient |
| 302.0 | Principal Resin 70% N.V. |
| 28.3 | Plasticizer-Nonylphenoxy Polypropoxyethanol (100% N.V.) |
| 162.6 | Crosslinker I (70.0% N.V.) |
| 4.84 | Acetic Acid |
| 142.8 | H2O Portion I |
| 0.68 | Ethylene glycol monobutyl ether |
| 200.0 | H$_2$O Portion II |
| 103.6 | H$_2$O Portion III |

Example 4

Preparation of Grind Resin

This general procedure was used to prepare a grind resin according to the present invention. First, 27.81 parts of the diglycidyl ether of bisphenol A and 1.44 parts xylene were charged into a reaction vessel. The charge was heated to 82° C. under a dry nitrogen atmosphere. Next, the heating of the reaction vessel was discontinued and a charge of 5.81 parts bisphenol A was added, together with 0.002 parts triphenyl phosphine catalyst. The heating of the reaction vessel was then continued to a temperature of 127° C. At this time, the reaction exothermed on its own, with a peak of about 150° C.-160° C. The extension was held above 150° C. until a EEW of 350 ±10 achieved (about 345).

Once the above-mentioned EEW was reached, 21.08 parts ethylene glycol monobutyl ether was added to the reaction vessel and the bath was then cooled to 49° C.

After a temperature of 49° C. is achieved, and a mixture of 7.77 parts of 9-amino-3,6-dioxanonan-1-ol and 4.07 parts dimethylaminopropylamine were added to the reaction vessel over a period of 6 minutes, followed by a pump flush of 0.53 parts ethylene glycol monobutyl ether. The batch exothermed to 104° C.-110° C., and the exotherm was held at or below 115° C. for one hour. Next, 4.92 parts ethylene glycol monobutyl ether was charged into the reaction vessel and the batch was cooled to 77° C. Next, 14.9 parts nonylphenolglycidyl ether was charged into the reaction vessel followed by a pump flush of 1.53 parts of ethylene glycol monobutyl ether. The batch exothermed to 88° C.-93° C., and the batch was held at this temperature for one hour. Finally, 10.03 parts ethylene glycol monobutyl ether was charged into the reaction vessel and the batch was cooled to 66° C. The resultant product was then filtered off through 25 micron bags and drummed.

The non-volatile content of the grind resin prepared in Example 1 was determined to be 60.0%, the weight per gallon 8.53 and the viscosity was about 4900 centipoises at 25° C.

Preparation of a Gray Pigment Paste

Eighteen-hundred (1800) parts of the grind resin prepared according to the foregoing procedure of this Example was initially taken with 2,447 parts of deionized water, followed by 2,460 parts of TiO$_2$, 590 parts of an extender based on aluminum silicate, 135 parts of lead silicate and 37 parts of carbon black. This mixture is comminuted by grinding to a Hegman number of from 5 to 7. One-thousand-two-hundred-fifty-five (1,255) parts of deionized water are added in order to obtain the desired paste consistency. This gray paste has a very long shelf life.

Example 5

Preparation of Electrocoating Baths I and II and Deposition of Coating Films

Two-thousand (2000) parts by weight of each of the principal resin emulsions described in Example 2 are mixed with 775 parts by weight of the above-described gray pigment paste. The bath solids are adjusted to 20% with deionized water (150° C., 30 minutes). The bath is then allowed to age for 3 days with stirring. The deposition of the coating films on zinc phosphated panel takes place during 2 minutes. The bath temperature is 27° C. The deposited films are baked at 180° C. for 20 minutes.

Example 6

Preparation of Electrocoating Bath With Principal Resin E and Deposition of Coating Film Approximately 1900 parts of the emulsion of Example 3 (32% N.V., 600 N.V. parts), about 525 parts of the pigment paste prepared according to Example 4 but containing the ingredients and amounts given in Table IV, about 23 parts of an acrylic flow solution prepared as given below in Table V, about 1600 parts water, about 20 parts Dowanol PPH (Dow Chemical Company) and about 1 part 25% acetic acid are combined at ambient temperature and mixed for about one hour. The bath solids are adjusted with aqueous acid, if necessary, to yield a solids content of about 21 to 24 percent.

The bath is placed in a pilot electrodeposition tank and allowed to age for 3 days with circulation. Electrodeposition of zinc phosphated panels is then performed by emersion of the panels in the bath for about 2 minutes at a voltage of 340 V and a temperature of 27° C. The coated panels are rinsed, then baked at 180° C. for 20–30 minutes to harden the films.

| Results of Deposition | |
|---|---|
| Film thickness | 24 microns |
| GM throwing power (cm) | 31.8 cm |
| Scab corrosion test | 3 mm Scribe creep |
| GM Gravelometer test | Pass |
| Water spot resistance | Excellent |

TABLE IV

Paste Formula

| Component | Total Wt | NV Wt | Pig Wt | Bind Wt | % PS | % Total |
|---|---|---|---|---|---|---|
| Grind resin of of Example 4 | 198.3 | 119.0 | - - | 119.0 | - - | 19.83 |
| Acetic Acid | 11.1 | — | - - | - - | - - | 1.11 |
| Defoamer (Tristar 27) | 7.0 | — | - - | - - | - - | 0.70 |
| Carbon Black 1.26 | 12.6 | 12.6 | 12.6 | - - | 3.0 | 1.26 |
| Lead Silicate (Basic White Lead) | 14.7 | 14.7 | 14.7 | - - | 3.5 | 1.47 |
| Clay Extender | 63.0 | 63.0 | 63.0 | - - | 15.0 | 6.30 |
| Titanium Dioxide | 329.7 | 329.7 | 329.7 | - - | 78.5 | 32.97 |
| Dibutylin Oxide (Fine Ground) | 21.0 | 21.0 | - - | 21.0 | - - | 2.10 |
| DI Water | 342.6 | — | - - | - - | - - | 34.26 |
| Totals | 1000.0 | 560.0 | 420.0 | 140.0 | (100.0) | (100.0) |

Formulated For: 56.0% N.V. Before Reduction
Grind Resin Parameters 60.0% N.V.; 489 AEW Neutralization 75.0%

TABLE V

| | Flow Agent Solution | |
|---|---|---|
| Component | Total Wt. | NV Wt. |
| Acrylic Flow Resin* 25% | 285.7 | 229.1 |
| Acetic Acid | 54.9 | . . |
| DI Water | 659.4 | . . |

TABLE V-continued

| | Flow Agent Solution | |
|---|---|---|
| Component | Total Wt. | NV Wt. |
| Totals | 1000.0 | 229.1 |

*Prepared by free radical polymerization of 20 wt. % butyl acrylate, 58 wt. % 2-hydroxyethyl acrylate, 20 wt. % dimethylaminoethyl methacrylate and 2 wt. % styrene.

We claim:

1. A coating composition comprising:
   a principal resin comprising a self-addition epoxide resin-polyamine adduct with pendant alkylphenoxy groups;
   a cross-linker comprising a blocked polyisocyanate compound;
   a grind resin comprising the reaction product of an aromatic diglycidyl ether, an aromatic diol, an aminopolyalkoxy alcohol, a diamine and an alkylaryl glycidyl ether;
   a plasticizer; and
   pigments selected from a group consisting of inorganic, organometallic and organic compounds.

2. A composition according to claim 1, further comprising a defoamer, neutralizing acids and solvents.

3. A composition according to claim 1, further comprising an anti-cratering agent selected from polyacrylate resins, polyether resins, polyester resins, and silicone resins.

4. A composition according to claim 3 wherein said anti-cratering agent is a polyacrylate resin having alkyl, aromatic, and dialkylamino pendant groups.

5. A composition according to claim 1 wherein said plasticizer is a poly(alkylene oxide) alcohol compound.

6. A composition according to claim 1, wherein the principal resin is the reaction product of a self-addition epoxide resin and a mixture of amines selected from the group consisting of amino alcohols and alkyldiamines, the equivalent ratio of amine mixture to adduct being from about 0.75 to 1 amine equivalent per epoxide group;
   the self-addition epoxide resin being the reaction product of an aromatic or alkylaromatic diepoxide having a molecular weight of from about 350 to 1500 and a phenol of the formula $RC_6H_4OH$ wherein R is hydrogen or an alkyl group of from 1 to 18 carbons, and the equivalent ratio of diepoxide to alkyl phenol being about 3 to 8 epoxy groups per phenol group.

7. A composition according to claim 6 wherein the equivalent ratio of diepoxide to alkylphenol is 3.5 to 4.5 epoxy groups per phenol group.

8. A composition according to claim 7, wherein the diepoxide is formed by reacting bisphenol A and a diglycidyl ether wherein the diglycidyl ether has a molecular weight of from about 300 to about 800.

9. A composition according to claim 6, wherein the adduct is formed from bisphenol A, glycidyl chloride and alkyl glycidyl ether of from about 4 to 12 carbons.

10. A composition according to claim 1, wherein the cross-linker is the reaction product of trimethylolpropane, toluene diisocyanate and an alkyl alcohol of from 4 to 12 carbons.

11. A composition according to claim 1 wherein the secondary amine has from 3 to 6 carbons in each alkyl group.

12. A composition according to claim 1, wherein the grind resin is a reaction product of bisphenol A diglycidyl ether, bisphenol A, nonylphenyl glycidyl ether, N,N-dimethyl propylene diamine and 9-amino-3,6-dioxanonan-1-ol.

13. A composition according to claim 1, wherein the plasticizer is nonylphenoxypolypropoxy alcohol or cresyloxypolypropoxy alcohol.

14. A composition according to claim 1, wherein the anti-cratering agent is a polymer of $C_1$–$C_6$ alkyl acrylate, styrene, $C_1$–$C_6$ hydroxyalkyl acrylate and dimethylaminoethyl acrylate.

15. A composition according to claim 1, wherein the weight percent ranges of ingredients relative to total weight of nonvolatile solids are about 30% to 55% of principal resin, about 15% to 30% of cross-linker, up to about 20% of grind resin, about 3% to 12% plasticizer, up to 35% pigments and up to about 3% anti-cratering agent.

16. A composition according to claim 15, wherein the weight percentages are about 40% principal resin, about 22% cross-linker, about 7% grind resin, about 5.5% plasticizer, about 25% pigments, and about 0.5% anti-cratering agent.

17. A coating composition comprising: about 30% to 55% of a principal resin formed by adducting a mixture of an amino alcohol of 4 to 8 carbons and primary/tertiary diamine with the self-condensate of an alkyl phenol of the formula $RC_6H_4OH$, R being hydrogen or an alkyl of 1 to 18 carbons, and bisphenol A-liquified-bisphenol A diglycidyl ether having a molecular weight of about 350 to 2000;

about 15% to 30% of a blocked isocyanate cross-linker formed from trimethylol propane, toluene diisocyante and alkyl alcohol of 4 to 12 carbons;

up to about 20% of a grind resin formed from bisphenol A diglycidyl ether, an aromatic diol, 9-amino-3,6-dioxanonan-1-ol, N,N-dialkyl alkylenediamine of 4 to 12 carbons and nonylphenolmonoglycidyl ether;

about 3% to 12% of a plasticizer comprising nonylphenoxypolypropoxy alcohol or cresyloxypolypropoxy alcohol; and up to about 35% pigments comprising inorganic, organometallic, or organic compounds or mixtures thereof;

the percentage being in weight relative to the total weight of the composition.

18. A composition according to claim 17 further comprising up to about 3% of an anti-cratering agent comprising a polymer of alkyl acrylate, styrene, hydroxyalkyl acrylate and dimethylaminoethyl acrylate.

19. A coating composition comprising:

about 40% of a principal resin formed by adducting a mixture of diethanolamine and N,N-dimethylpropylene diamine with the self-condensate of nonylphenol and the diepoxide bisphenol A-liquified-bisphenol A diglycidyl ether having a molecular weight of 350 to 2000;

about 22% of a blocked isocyanate cross-linker formed from trimethylolpropane, toluene diisocyanate and 3-oxahexan-1-ol;

about 7% of a grind resin formed from bisphenol A diglycidyl ether, bisphenol A, nonylphenylmonoglycidyl ether, 9-amino-3,6-dioxanonan-1-ol and N,N-dimethylpropylene diamine;

about 5.5% of a plasticizer selected from nonylphenoxypolypropoxyethanol and cresylphenoxypolypropoxyethanol;

about 0.5% of an anti-cratering agent comprising a polymer of butyl acrylate, 2-hydroxyethyl acrylate, dimethylaminoethyl acrylate and styrene; and about 25% pigments comprising inorganic, and/or organic compounds and/or mixtures thereof.

20. A coating composition according to claim 17, wherein the equivalent ratio of amine mixture to self-addition epoxy resin is from about 0.75 to about 1 amine equivalent per epoxide group.

21. A coating composition according to claim 17, wherein the equivalent ratio of diepoxide to alkylphenol is 3:1 to 8:1 epoxy to phenoxy groups.

22. A coating composition according to claim 17, wherein the equivalent ratio of diepoxide to alkylphenol is 3.5:1 to 4.5:1 epoxy to phenoxy groups.

23. A coating bath comprising a mixture of about 20 to 30 weight percent of the composition of each of claim 17, and a remaining weight percent of defoaming agents and an acidic, aqueous medium of pH about 4.5 to 7.

24. An article electrocoated with a composition according to each of the claim 17.

25. A coating composition comprising:

a principal resin comprising a self-addition epoxide resin-polyamine adduct with pendant $C_{1-18}$ alkylphenyoxy groups;

a cross linker comprising a blocked polyisocyanate compound which substantially deblocks at about 120° C. to about 200° C., and which contains at least two crosslinking sites;

a grind resin comprised of the reaction product of an aromatic diepoxide, a bis (aromatic alcohol), a polyglycol amine, a diamine and a alkylarylmonoepoxide ether;

a plasticizer; and pigments selected from the group consisting of inorganic, organometallic and organic compounds.

26. The composition of claim 25 wherein the grind resin contains nonylphenol glycidyl ether as the alkylaryl monoepoxide ether.

* * * * *